United States Patent
Yamamoto

(10) Patent No.: US 9,709,880 B2
(45) Date of Patent: Jul. 18, 2017

(54) LIGHT SOURCE UNIT HAVING SEMICONDUCTOR LIGHT EMITTING ELEMENTS AND PROJECTOR HAVING SAME LIGHT SOURCE UNIT

(71) Applicant: CASIO COMPUTER CO., LTD., Shibuya-ku, Tokyo (JP)

(72) Inventor: Kyo Yamamoto, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/842,450

(22) Filed: Sep. 1, 2015

(65) Prior Publication Data

US 2016/0077418 A1    Mar. 17, 2016

(30) Foreign Application Priority Data

Sep. 17, 2014  (JP) ................. 2014-188697

(51) Int. Cl.
  *G03B 21/20*    (2006.01)
  *G03B 21/00*    (2006.01)
  *G03B 21/16*    (2006.01)

(52) U.S. Cl.
  CPC ....... *G03B 21/2013* (2013.01); *G03B 21/208* (2013.01); *G03B 21/2033* (2013.01); *G03B 21/005* (2013.01); *G03B 21/16* (2013.01); *G03B 21/204* (2013.01)

(58) Field of Classification Search
  CPC ...... G03B 21/00; G03B 21/14; G03B 21/204; G03B 21/2033; F21Y 2105/10; F21Y 2105/12; F21Y 2115/10; H01S 3/0057; H01S 3/0941
  See application file for complete search history.

(56) References Cited

U.S. PATENT DOCUMENTS

| | | | |
|---|---|---|---|
| 2002/0024821 A1* | 2/2002 | Yen | F21K 9/00 362/555 |
| 2005/0205878 A1* | 9/2005 | Kan | F21V 5/045 257/80 |
| 2008/0174739 A1* | 7/2008 | Iwasaki | G03B 21/26 353/30 |
| 2012/0300178 A1* | 11/2012 | Sugiyama | H04N 9/3111 353/31 |

(Continued)

FOREIGN PATENT DOCUMENTS

| | | |
|---|---|---|
| CN | 103885276 A | 6/2014 |
| JP | 2011133782 A | 7/2011 |

OTHER PUBLICATIONS

Chinese Office Action (and English translation thereof) dated Oct. 8, 2016, issued in counterpart Chinese Application No. 201510592016.0.

*Primary Examiner* — Sultan Chowdhury
(74) *Attorney, Agent, or Firm* — Holtz, Holtz & VOlek PC

(57) ABSTRACT

There is provided a light source unit having an excitation light shining device in which a plurality of semiconductor light emitting elements are arranged in rows and columns so that in the plurality of semiconductor light emitting elements, the direction of a major axis of an elliptic cross section of a light beam emitted from one semiconductor light emitting element is normal to the directions of major axes of elliptic cross sections of light beams emitted from adjacent light emitting elements.

14 Claims, 12 Drawing Sheets

(56) References Cited

U.S. PATENT DOCUMENTS

2013/0329276 A1* 12/2013 Nakayama ............... H01S 3/08
                                                                  359/328
2014/0168971 A1    6/2014 Kurosaki

* cited by examiner

LIGHT SOURCE UNIT HAVING SEMICONDUCTOR LIGHT EMITTING ELEMENTS AND PROJECTOR HAVING SAME LIGHT SOURCE UNIT

CROSS-REFERENCE TO RELATED APPLICATION

This patent application is based upon and claims the benefit of priority under 35 USC 119 from the prior Japanese Patent Application No. 2014-188697 filed on Sep. 17, 2014, the entire disclosure of which, including the description, claims, drawings and abstract, is incorporated herein by reference.

BACKGROUND OF THE INVENTION

Field of the Invention

The present invention relates to a light source unit having semiconductor light emitting elements and a projector having the same light source unit.

Description of the Related Art

In these days, data projectors are used on many occasions as an image projection system which projects an image of a screen and a video image of a personal computer, as well as images based on image data which is stored on a memory card or the like on to a screen. In these data projectors, light emitted from a light source is collected to a micromirror display device called a DMD (Digital micromirror Device) or a liquid crystal panel for displaying a color image on the screen.

Conventionally, the mainstream of these data projectors has been those which utilize a high-intensity discharge lamp as a light source. In recent years, however, there have been developed projectors which have a light source including a semiconductor light emitting element such as a laser diode which emits a laser beam of a high light intensity and a high luminance with consumed power.

For example, the Japanese Unexamined Patent Publication No. 2011-133782 (JP-A-2011-133782) discloses a projector having an excitation light shining device in which a plurality of blue laser diodes are arranged into a matrix configuration. A luminescent light emitting device uses light emitted from the excitation light shining device as excitation light to thereby emit luminescent light in the green wavelength range. Then, laser beams emitted from the blue laser diodes of the excitation light shining device are shone on to a shining spot on a luminescent plate with major axes of elliptic cross sections of the individual blue laser beams being caused to overlap at an angle of 45 degrees or 90 degrees.

In general, it is known that a laser beam emitted from a laser diode which is a semiconductor light emitting element is coherent light. Consequently, as in the projector of JP-A-2011-133827, in the light emitted from the excitation light shining device in which the plurality of laser diodes are arranged in to the matrix configuration, in case the laser beams emitted from the individual laser diodes overlap, a wavelength interference is generated. Then, in the event that the pencil of light in which the wavelength interference is generated is shone on to a luminescent material as excitation light, Unevenness in luminance or color is generated in projected light which is displayed on the screen through the use of the luminescent light from the luminescent material as a light source.

Additionally, in the conventional arrangement of laser diodes, adjacent laser beams which strike the surface of the luminescent material are arranged to lie with a narrow gap defined therebetween, and therefore, there exits a possibility that adjacent laser beams strike the luminescent material while overlapping each other due to unevenness in direction in which laser beams are emitted from the laser diodes or mechanical tolerance in relation to the mechanisms involved. As this occurs, there is caused a possibility that the luminescent material is saturated to thereby reduce the light emitting efficiency.

SUMMARY OF THE INVENTION

Thus, an object of the invention is to provide a light source unit which can obtain clear image light by restricting the occurrence of unevenness in color or the like through reduction in interference between laser beams which are emitted from semiconductor light emitting elements and a projector which includes this light source unit.

According to a first aspect of the invention, there is provided a light source unit having an excitation light shining device in which a plurality of semiconductor light emitting elements are arranged in rows and columns so that in the plurality of semiconductor light emitting elements, the direction of a major axis of an elliptic cross section of a light beam emitted from one semiconductor light emitting element is normal to the directions of major axes of elliptic cross sections of light beams emitted from adjacent light emitting elements.

According to a second aspect of the invention, there is provided a projector having the light source unit according to the first aspect of the invention, a display device on to which light source light from the light source unit is shone to thereby form image light, a projection side optical system which projects the image light emitted from the display device on to a screen, and a projector control unit which controls the display device and the light source unit.

DETAILED DESCRIPTION OF THE PREFERRED EMBODIMENTS

First Embodiment

Figure 1:
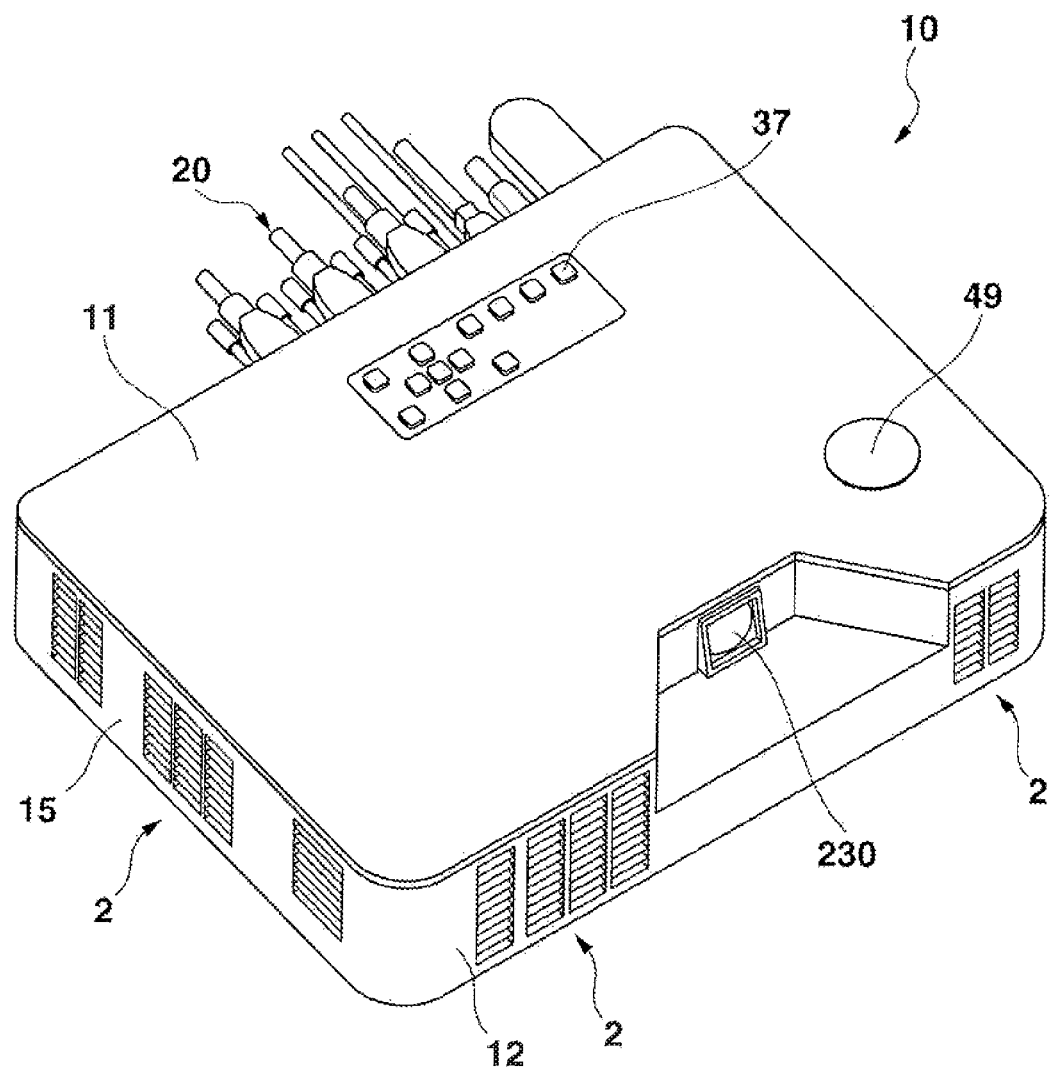
FIG. 1 is an external perspective view showing a projector according to a first embodiment of the invention.

Hereinafter, embodiments of the invention will be described based on the accompanying drawings. FIG. 1 is an external perspective view of a projector 10. When referred to in relation to the projector 10 in this embodiment, left and right denote, respectively, left and right with respect to a projecting direction, and front and rear denote, respectively, front and rear with respect to a direction towards a screen from the projector 10 and a traveling direction of a pencil of light emitted from the projector 10.

The projector 10 has a substantially rectangular parallelepiped casing which is made up of an upper panel 11, a front panel 12, a right side panel 15, and a back panel, a left side panel and a bottom panel which are not shown in FIG. 1. A recess portion which has a trapezoidal shape when looked at from thereabove is formed in a position on the front panel 12 which lies slightly closer to a left end portion thereof with an upper base of the trapezoidal recess portion being oriented towards the rear of the projector 10. A projection lens 230 is provided in a rear wall of the recess portion. An image is projected in the direction of a screen by this projection lens 230.

A number of inlet and outlet ports 2 which are rectangular ports are provided in the front panel 12 and the right side panel 15 to cool constituent units and devices of the projector 10 which are disposed in an interior of the casing. Although not shown, inlet and outlet ports are also provided in each of the back panel and the left side panel. Additionally, a loud speaker window 49 and a keys/indicators unit 37 are provided on the upper panel 11. Disposed on this keys/indicators unit 37 are keys and indicators which include a power indicator, a projection switch key, an overheat indicator, and the like. The power indicator informs whether a power switch key or a power supply is on or off. The projection switch key switches on and off the projection by the projector 10. The overheat indicator informs of an overheat condition occurring in a light source unit, a display device, a control unit or the like when they really overheat.

An input/output connector unit where USB terminals, an image signal D-SUB terminal where analog RGB image signals are inputted, an S terminal, an RCA terminal and the like are provided and various types of terminals including a power supply adaptor plug are provided on the back panel. Further, although not shown, the projector 10 includes an Ir reception unit which receives a control signal from a remote controller.

Figure 2:
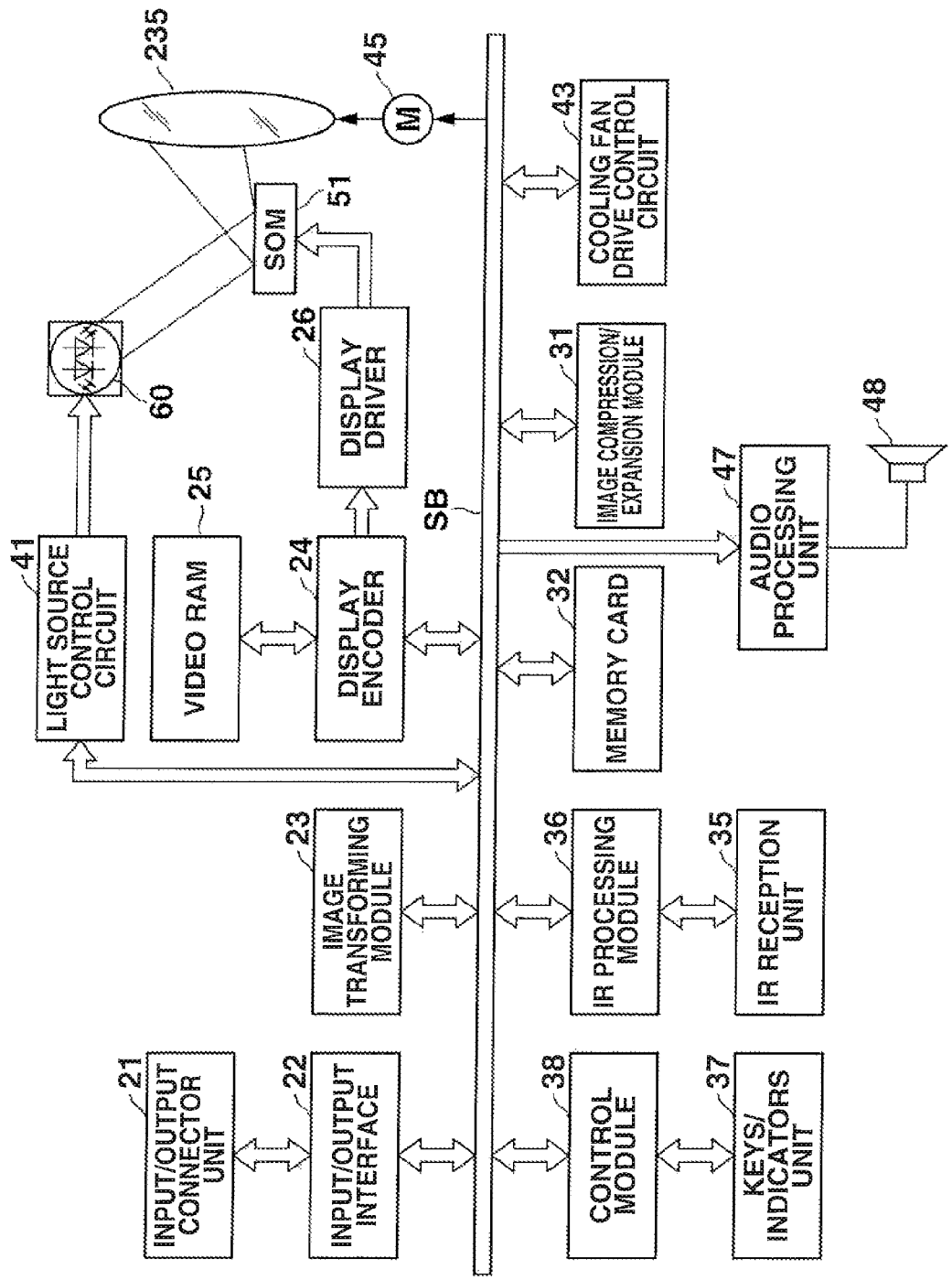
FIG. 2 is a functional block diagram of the projector according to the first embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards that are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to an output of the image signal from the display encoder 24. In this projector 10, a pencil of light that is emitted from a light source unit 60 is shone onto the display device 51 via a light source side optical system which will be described hereinafter, whereby an optical image is formed by using reflected light reflected by the display device 51. The image so formed is then projected on to a screen, not shown, for display thereon via a projection side optical system. A movable lens group 235 of the projection side optical system is driven by a lens motor 45 for zooming or focusing.

An image compression/expansion module 31 performs a recording process of data compressing a brightness signal and a color difference signal of the image signal to be sequentially written on a memory card 32 that is a detachable recording medium through operations using ADCT and the Huffman method.

Further, when in a reproducing mode, the image compression/expansion module 31 reads out the image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 which includes the keys and the indicators which are provided on the upper case 11 of the casing are sent out directly to the control module 38. Key operation signals from the remote controller are received by the Ir reception unit 35, and code signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a loudspeaker 48 to output loudly sound or voice based on the audio data.

The control module 38 controls a light source control circuit 41 which is configured as a light source control unit. This light source control circuit 41 controls separately and individually the emission of light in the red wavelength range, light in the blue wavelength range and light in the green wavelength range from a red light source device which is a first light source of the light source unit 60, a blue light source device which is a second light source of the light source unit 60 and an excitation light shining device which is an excitation light source for generating light in the green wavelength range, respectively, so that those lights in the predetermined wavelength ranges which are required when an image is generated are emitted from the light source unit 60.

The control module 38 causes a cooling fan drive control circuit 43 to detect temperatures through a plurality of temperature sensors which are provided in the light source unit 60 and the like so as to control the rotating speeds of cooling fans based on the results of the temperature detections. The control module 38 also controls the cooling fan drive control circuit 43 so that the cooling fans continue to rotate even after the power supply to the projector 10 itself is turned off through a timer or the power supply to the projector 10 itself is turned off depending upon the results of the temperature detections by the temperature sensors.

Figure 3:
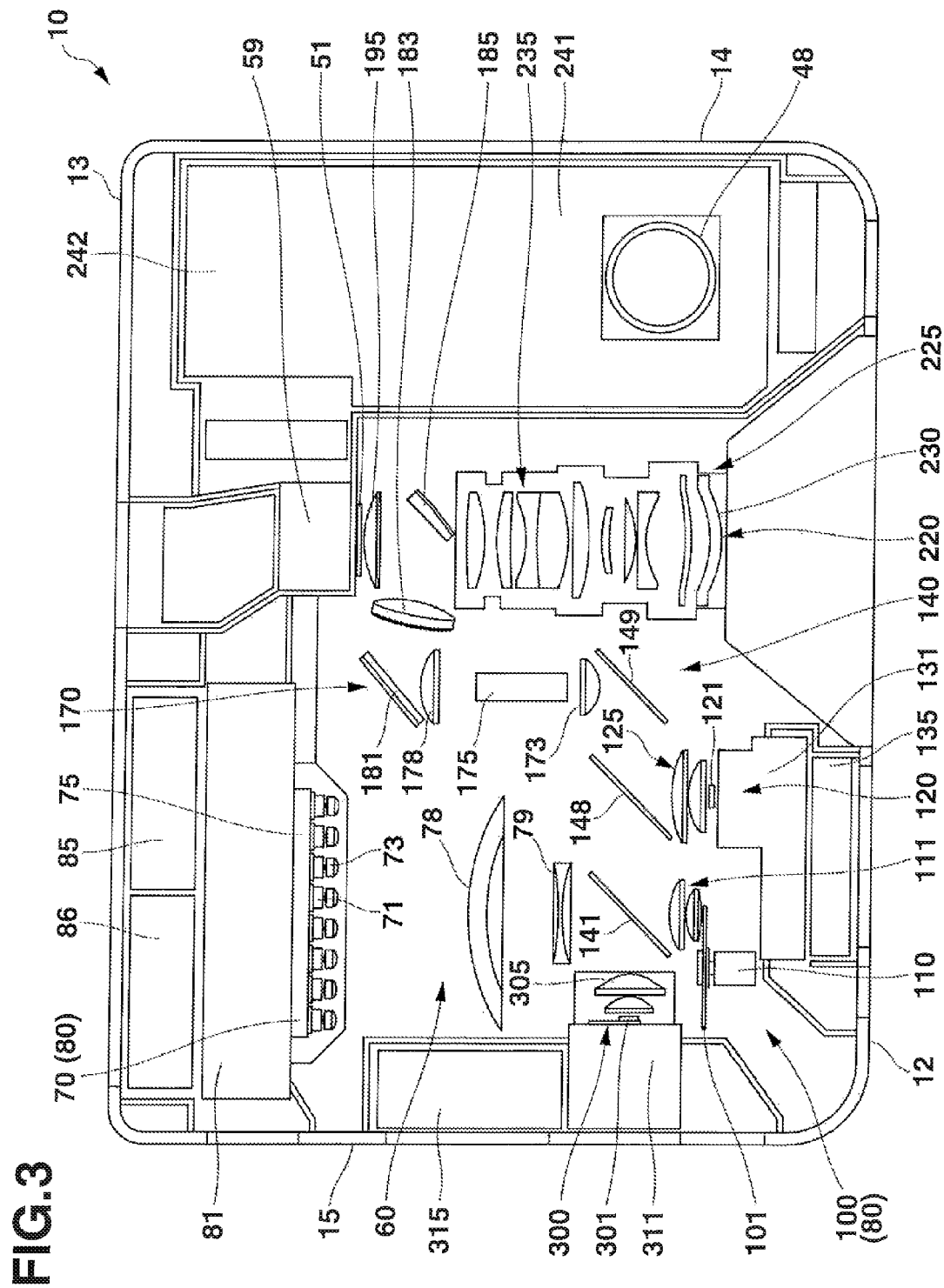
FIG. 3 is a schematic plan view showing an internal construction of the projector according to the first embodiment of the invention.

Next, an internal construction of the projector 10 will be described. FIG. 3 is a schematic plan view showing the internal construction of the projector 10. The projector 10 has the light source unit 60, a light source side optical system 170 which guides light source light from the light source unit 60 to the display device 51, and a projection side optical system 220 which projects an image emitted from the display device 51 on to a screen, not shown.

The projector 10 has a power supply circuit block 241 near the left side panel 14. A power supply circuit board 242 is disposed in the power supply circuit block 241. A power supply circuit is mounted on the power supply circuit board 242 for generation of various power supply voltages for power supplies for turning on the light sources, a main power supply for a DMD and various ICs, and a driving power supply for driving mechanism systems such as motors.

Various signals of the keys/indicators unit 37 which is made up of main keys and indicators which are provided on the upper panel 11 are connected to a main circuit board, not shown, and the various ICs including the CPU which are disposed near the power supply circuit block 241 are mounted on the main circuit board. Thus, the control circuit which governs the control of the whole of the projector 10 is mounted.

In the projector 10, the projection side optical system 220 is provided on a side of the power supply circuit block 241 which faces the right side panel 15 in a position which lies slightly closer to the left side panel 14 than a center of the casing of the projector 10 in a left-to-right direction thereof. Additionally, the projector 10 includes the light source unit 60 which is disposed on a side of the projection side optical system 220 which faces the right side panel 15.

The light source unit 60 is made up of a green light source device 80 which emits light in the green wavelength range, a red light source device 120 which is a first light source which emits light in the red wavelength range, a blue light source device 300 which is a second light source which emits light in the blue wavelength range, and a light guiding optical system 140. The green light source device 80 is made up of an excitation light shining device 70 and a luminescent plate device 100. The excitation light shining device 70 is disposed near the back panel 13. The luminescent plate device 100 is disposed on light axes of pencils of light which are emitted from the excitation light shining device 70 and near the front panel 12.

The red light source device 120, which is the first light source, is disposed near the front panel 12 so as to be parallel to a pencil of light which is emitted from the luminescent plate device 100. Additionally, the blue light source device 300, which is the second light source, is disposed between the excitation light shining device 70 and the luminescent plate device 100. The light guiding optical system 140 changes the directions of axes of the light in the red wavelength range, the light in the green wavelength range and the line in the blue wavelength range in such a way that the red, green and blue light axes are directed in the same direction and collects the red, green and blue lights to an entrance port of a light tunnel 175.

The excitation light shining device 70 of the green light source device 80 includes a plurality of blue laser diodes 71 which are disposed so that their optical axes intersect the back panel 13 at right angles, collimator lenses 73 which are disposed individually in front of the blue laser diodes 71, collective lenses 78, 79 which collect laser beams emitted from the blue laser diodes 71 which are semiconductor light emitting elements and a heat sink 81 which is disposed between the blue laser diodes 71 and the back panel 13. Additionally, cooling fans 85, 86 are disposed on a side of the heat sink 81 which faces the back panel 13.

The blue laser diodes 71 are held by a flat plate-shaped holder 75. The collimator lenses 73 convert laser beams emitted from the blue laser diodes 71 into parallel beams so as to enhance the directivity thereof. Lens centers of the plurality of collimator lenses 73 are slightly offset from optical axes of the blue laser diodes 71 along which laser beams are emitted therefrom so that laser beams or pencils of light emitted from the blue laser diodes 71 are emitted to the collective lens 78 with spaces between the pencils of light narrowed. The laser beams so emitted are then collected by the collective lens 78 and the collective lens 79 and further a collective lens group 111 to be shone on to a luminescent plate 101 of the luminescent plate device 100.

The luminescent plate device 100 of the green light source device 80 includes the luminescent plate 101 which is disposed so as to be parallel to the front panel 12, that is, so as to be at right angles to an axis of light emitted from the excitation light shining device 70, a motor 110 for driving to rotate the luminescent plate 101 and the collective lens group 111 which collects pencils of light which are emitted towards the back panel 13 from the luminescent plate 101.

Figure 4A:
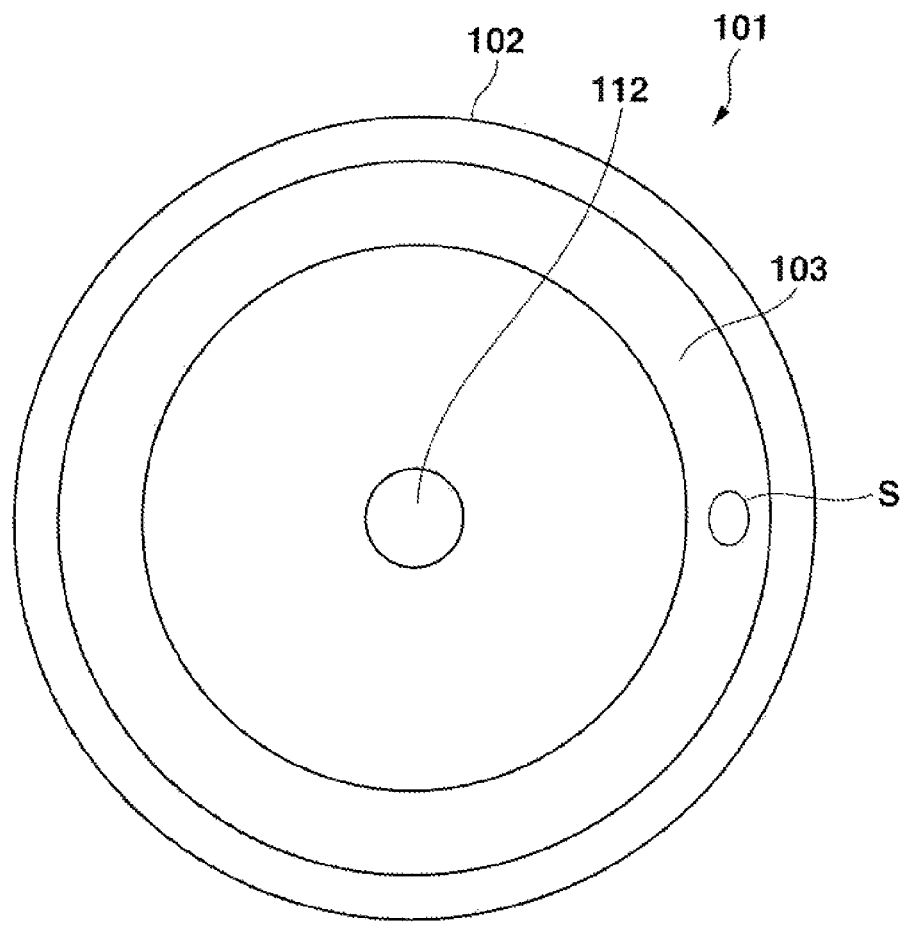
FIG. 4A is a front view of a luminescent plate according to the first embodiment of the invention.
Figure 4B:
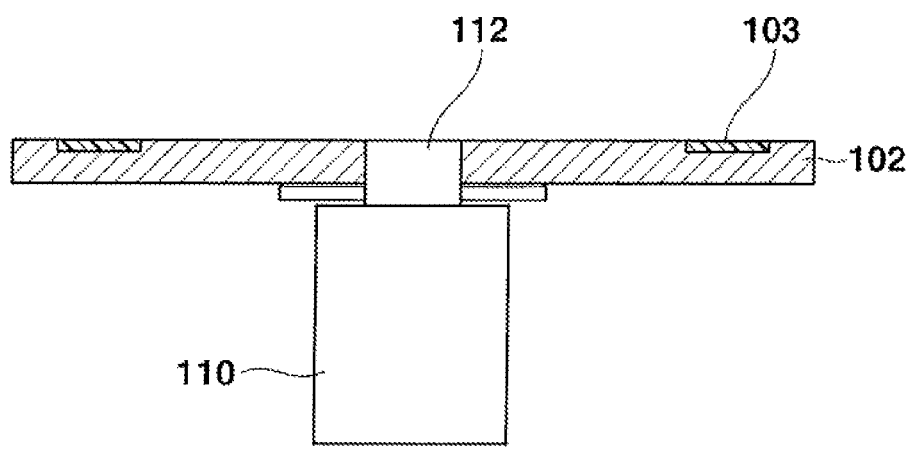
FIG. 4B is a sectional view of the luminescent plate according to the first embodiment of the invention.

Here, as shown in FIG. 4, the luminescent plate 101 which is a luminescent wheel has a disc-shaped metallic base 102 which is provided on a rotational shaft 12 of the motor 110. This base 102 is mirror finished through silver deposition or the like whereby a reflecting surface which reflects light is formed thereon. An annular recess portion is formed on the base 102, and a luminescent light emitting area 103 is formed into an annular shape in the recess portion. This luminescent light emitting area 103 is made up of a layer of a green luminescent material which is mixed with a transparent resin binder.

Then, light emitted from the excitation light shining device 70 is shone on to a shining spot S on the luminescent light emitting area 103 of the luminescent plate 101 to thereby excite the green luminescent material in the green luminescent material layer of the luminescent light emitting area 103. Pencils of light which are emitted in all directions from the green luminescent material are emitted directly towards the excitation light shining device 70 or are reflected on the reflecting surface of the luminescent plate 101 to thereafter be emitted indirectly towards the excitation light shining device 70.

Excitation light which is shone on to the metallic base without being absorbed by the luminescent material in the luminescent material layer is reflected on the reflecting surface to thereby be incident on the luminescent material layer again to excite the luminescent material. Consequently, the utilization efficiency of excitation light which is emitted from the blue laser diodes 71 can be enhanced by making the front surface of the recess portion of the luminescent plate 101 into the reflecting surface, whereby brighter luminescent light can be emitted from the luminescent plate 101.

In the excitation light which is reflected towards the green luminescent material layer on the reflecting surface of the luminescent plate 101, the excitation light which is emitted towards the excitation light shining device 70 without being absorbed by the luminescent material passes through a first dichroic mirror 141 and luminescent light is reflected by the first dichroic mirror 141. Therefore, there is no risk of the excitation light being emitted to an exterior portion of the projector 10.

In FIG. 3, the blue light source device 300, which is the second light source of the light source unit 60, includes a blue light source 301 which is disposed so as to be at right angles to an axis of light emitted from the luminescent plate device 100 and a collective lens group 305 which collects light emitted from the blue light source 301. The blue light source device 300 is disposed so that its optical axis intersects an axis of light emitted from the red light source device 120. Additionally, the blue light source 301 is a blue light emitting diode as a semiconductor light emitting element which emits light in the blue wavelength range.

The blue light source device 300 includes a heat sink 311 which is disposed on a side of the blue light source 301 which faces the right side panel 15. A cooling fan 315 configured to cool the heat sink 311 is disposed between the heat sink 311 and the back panel 13.

The red light source device 120, which is the first light source of the light source unit 60, includes a red light source 121 which is disposed so that its optical axis becomes parallel to optical axes of the blue laser diodes 71 and a collective lens group 125 which collects light emitted from the red light source 121. This red light source device 120 is disposed so that its optical axis becomes parallel to light emitted from the excitation light shining device 70 and light in the green wavelength range which is emitted from the luminescent plate 101.

The red light source 121 is a red light emitting diode which is a semiconductor light emitting element which emits light in the red wavelength range. The red light source device 120 includes a heat sink 131 which is disposed on a side of the red light source 121 which faces the front panel 12. A cooling fan 135 configured to cool the heat sink 131 is disposed on a side of the heat sink 131 which faces the front panel 12.

The light guiding optical system 140 is made up of the first dichroic mirror 141, a second dichroic mirror 148 and a reflecting mirror 149. The first dichroic mirror 141 is disposed in a position where the axis of light in the blue wavelength range which is emitted from the excitation light shining device 70 and the axis of light in the green wavelength range which is emitted from the luminescent plate 101 intersect the axis of light in the blue wavelength range which is emitted from the blue light source device 300 at right angles. The first dichroic mirror 141 transmits light in the blue wavelength range and reflects light in the green wavelength range so as to change the direction of the axis of the light in the green wavelength range by 90 degrees.

The second dichroic mirror 148 is disposed in a position where the axis of light in the red wavelength range which is emitted from the red light source device 120 intersects the axis of light in the blue wavelength range which is emitted from the blue light source device 300 at right angles. The second dichroic mirror 148 transmits light in the blue wavelength range and light in the green wavelength range and reflects light in the red light wavelength range so as to change the direction of the axis of the light in the red wavelength range by 90 degrees. The lights in the blue and green wavelength ranges which pass through the second dichroic mirror 148 or the light in the red wavelength range which is reflected by the second dichroic mirror 148 is reflected by the reflecting mirror 149 so that the directions of the axes of the blue, green and red lights are changed by 90 degrees whereby the blue, green and red lights are incident on a light tunnel 175 by way of the collective lens 173.

The light source side optical system 170 includes the collective lens 173, the light tunnel 175 which is a light guiding member, a collective lens 178, a light axis changing mirror 181, a collective lens 183, a light shining mirror 185, and a condenser lens 195. The condenser lens 195 collects light emitted from the display device 51 to cause it to be incident on a movable lens group 235 and a fixed lens group 225, and therefore, the condenser lens 195 is also regarded as one of constituent elements of the projection side optical system 220.

Pencils of light which are emitted from the light source unit 60 are collected to an entrance port of the light tunnel 175 by the collective lens 173. The pencils of light which enter the light tunnel 175 are made uniform in terms of intensity distribution in the light tunnel 175. The pencils of light which exit from an exit port of the light tunnel 175 are collected by the collective lens 178, whereafter the directions of axes of the pencils of light are changed towards the left side panel 14 by the light axis changing mirror 181.

The pencils of light which are reflected at the light axis changing mirror 181 are collected by the collective lens 183 and thereafter are shone on to the display device 51 at a predetermined angle by way of the condenser lens 195 by the light shining mirror 185. A heat sink 59 is provided on a side of the display device 51 which faces the back panel 13, and the display device 51 is cooled by this heat sink 59.

The light source light shone on to an image forming surface of the display device 51 by the light source side optical system 170 is reflected on the image forming surface of the display device 51 and is projected on to a screen via the projection side optical system 220. Here, the projection side optical system 220 is made up of the condenser lens 195, the movable lens group 235, the fixed lens group 225, and the projection lens 230. The fixed lens group 225 is incorporated in a fixed lens barrel. The movable lens group 235 is incorporated in a movable lens barrel and is made to move by a lens motor. Zooming and focusing are enabled by making the movable lens group 235 move by the use of the lens motor. Consequently, a lens group of the projection side optical system 220 which is made up of the movable lens group 235 and the fixed lens group 225 constitutes a variable-focus lens.

By configuring the projector 10 in this way, when the luminescent plate 101 is rotated and lights are emitted at different timings from the excitation light shining device 70 and the red light source device 120, light in the red wavelength range, light in the green wavelength range and light in the blue wavelength range sequentially enter the collective lens 173 and the light tunnel 175 via the light guiding optical system 141 and are further made to enter the display device 51 via the light source side optical system 170. Then, the DMD, which is the display device 51 of the projector 10, displays red, green and blue lights according data in a time-sharing fashion, whereby a color image can be projected on the screen.

Figure 5:
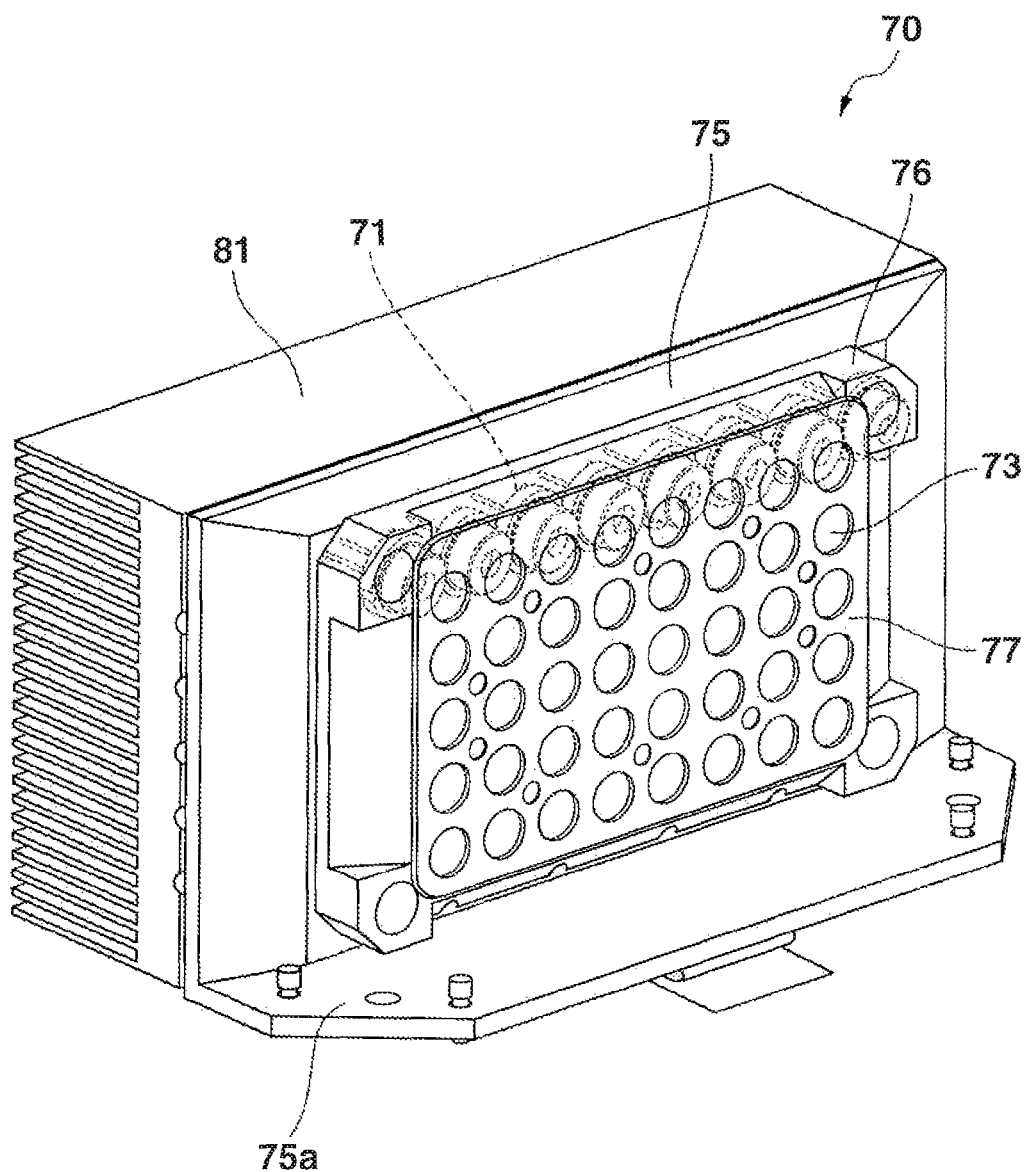
FIG. 5 is a perspective view of an excitation light shining device according to the first aspect of the invention.

Next, referring to FIG. 5, the excitation light shining device 70 will be described. A lens holding member 76 configured to hold the collimator lenses 73 is provided on the excitation light shining device 70. A lens fastening plate 77 is provided on the lens holding member 76 from a direction in which laser beams are emitted by the blue laser diodes 71, whereby the collimator lenses 73 are fastened by the lens fastening plate 77. The holder 75 configured to hold the blue laser diodes 71 is joined to a back side of the lens holding member 76. A heat sink 81 is joined to a back side of the holder 75. The lens holding member 76, the lens fastening plate 77, the holder 75 and the heat sink 81 are fixed to each other with bolts. Then, a flat plate-shaped base portion 75a which projects from the holder 75 is fixed to the bottom panel of the projector 10.

The blue laser diodes 71 and the collimator lenses 73 are arranged in rows and columns. In this embodiment, a total of 40 blue laser diodes 71 and collimator lenses 73 are provided in five rows and eight columns.

Figure 6:
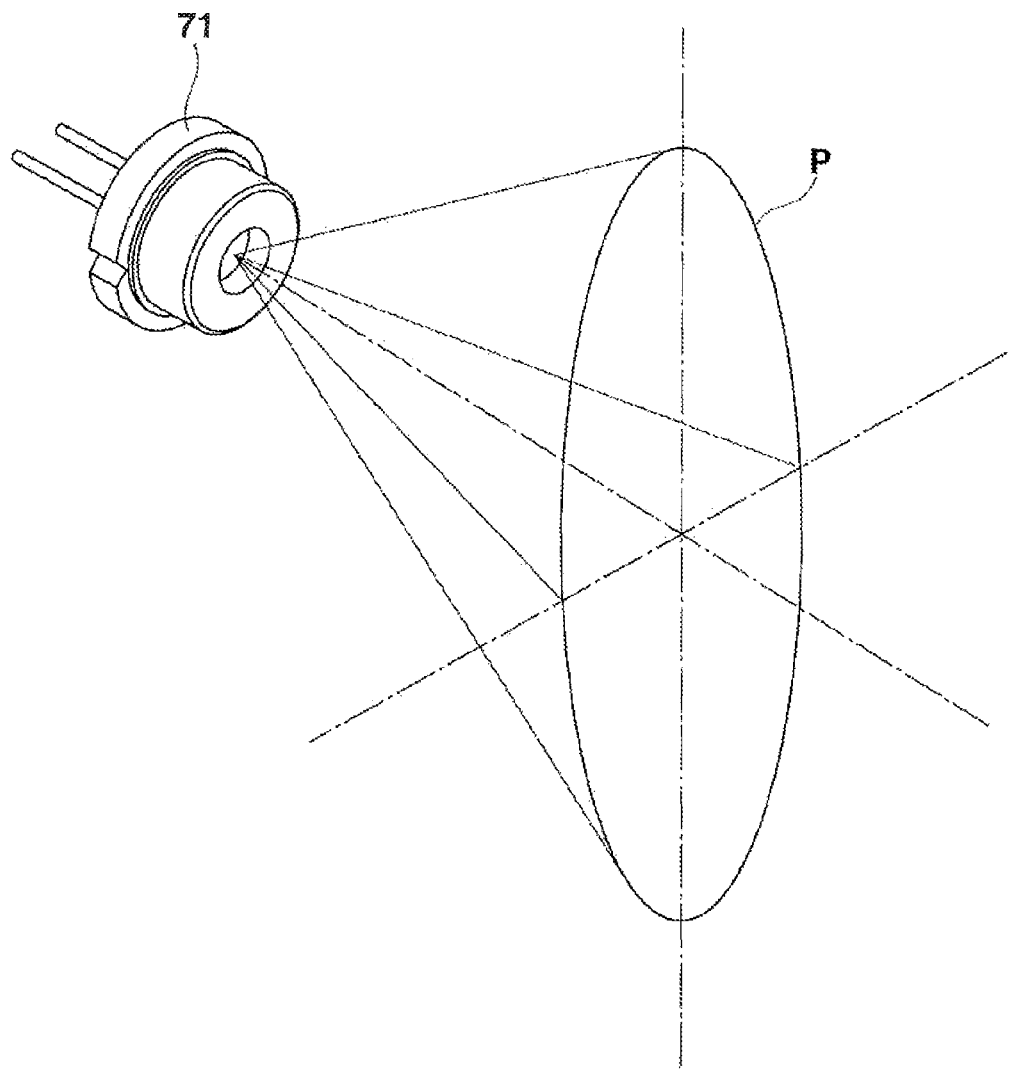
FIG. 6 is a perspective view showing how a laser diode according to the first embodiment of the invention emits light.

Here, in general, a laser diode has different radiation angles in a vertical direction and a horizontal direction with respect to a joining plane of the diode. Because of this, as shown in FIG. 6, it is known that a cross section of a laser beam emitted from a laser diode (the blue laser diode 71) takes an elliptic shape. In this embodiment, the excitation light shining device 70 is configured by disposing the laser diodes 71 so that a major axis direction of an elliptic cross section P of the laser beam emitted from one blue laser diode 71 becomes normal to major axis directions of elliptic cross sections P of laser beams emitted from adjacent blue laser diodes 71.

Figure 7A:
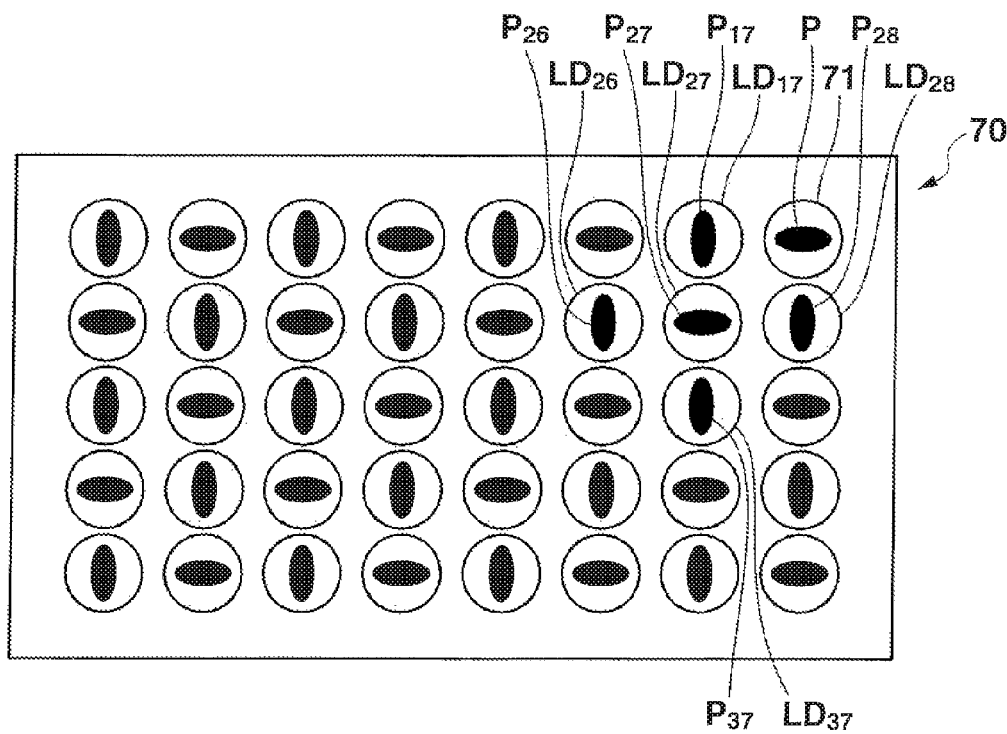
FIG. 7A is a front view of the excitation light shining device, showing a relationship between an arrangement of laser diodes according to the first embodiment of the invention and light beams shone by the laser diodes.

Specifically, the blue laser diodes 71, which are semiconductor light emitting elements, are arranged as shown in FIG. 7A. Here, FIG. 7A is a schematic view resulting when the excitation light shining device 70 is seen from the direction in which laser beams are emitted from the blue laser diodes 71. As shown in FIG. 7A, for example, a major axis direction of an elliptic cross section P27 of a laser beam which is emitted from LD27 which is the blue laser diodes 71 disposed in a second row from the top and a seventh column from the left is normal to major axis directions of elliptic cross sections P26, P28, P17, P37 of LD26, LD28, LD17, LD 37 which are the blue laser diodes disposed adjacent to LD27 in the row and column directions (in other words, the vertical and horizontal directions).

Then, the blue laser diodes 71 are arranged so that major axis directions of elliptic cross sections P of laser beams emitted therefrom are at 90 degrees with respect to the row or column direction. For example, LD17 is disposed so that the major axis direction of the elliptic cross section P17 is at 90 degrees with respect to the row direction, and LD 27 is disposed so that the major axis direction of the elliptic cross section P27 is at 90 degrees with respect to the column direction. Namely, the major axis directions of the elliptic cross sections P of the laser beams emitted from the blue laser diodes 71 are almost parallel to the row direction or are almost parallel to the column direction in which the blue laser diodes 71 are aligned.

Figure 7B:
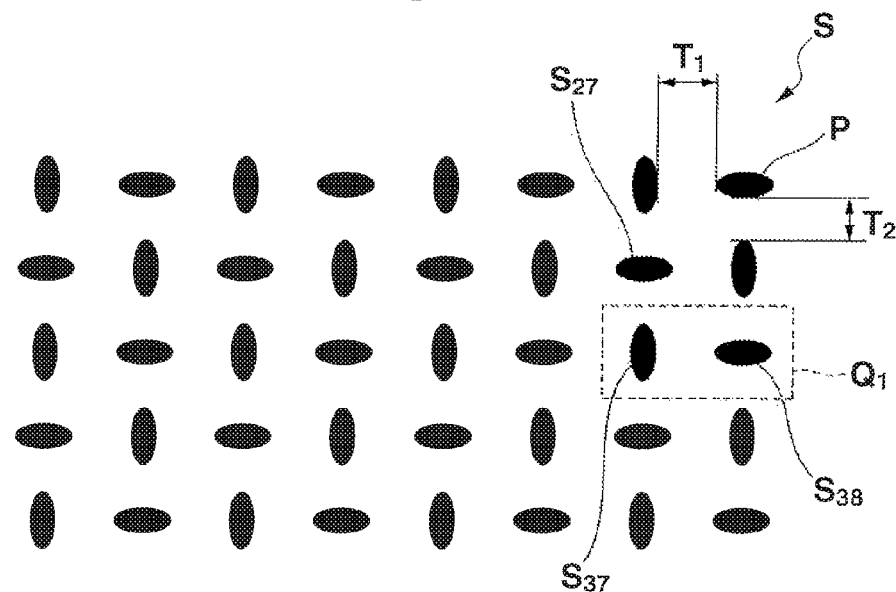
FIG. 7B is a diagram showing the relationship between the arrangement of the laser diodes according to the first embodiment of the invention and the light beams shone by the laser diodes, which shows how the light beams from the laser diodes are shone on to a shining spot on the luminescent plate.

Then, when excitation light is shone from the excitation light shining device 70 which is arranged in the way described above on to the luminescent plate 101, a shining spot S is formed as shown in FIG. 7B. The shining spot S is formed as a result of laser beams individually emitted from the blue laser diodes 71 being shone on to the luminescent light emitting area 103 so that the laser beams are arranged in the same as the arrangement of the blue laser diodes 71 in the excitation light shining device 70. For example, a laser beam emitted from LD27 (refer to FIG. 7A) which is the blue laser diode 71 disposed in the second row from the top and the seventh column from the left is shone on to the shining spot S in a position which is disposed in the same way as LD27, that is, in a position S27 which is disposed in a second row from the top and a seventh column from the left.

Namely, the whole image of the excitation light shining device 70 is reduced in size by the collective lens 78 to be projected on to the shining spot S shown in FIG. 4A, and the laser beams from each of the blue laser diodes are made into parallel pencils of light by each of the collimator lenses 73, whereby the laser beams from the blue laser diodes 71 are shone on to the luminescent light emitting area 103.

In this way, the laser beams emitted from the blue laser diodes 71 are shone so as not to overlap one another. In other words, predetermined gaps are defined between an elliptic boundary or an outer circumferential edge of the elliptic cross section P of the laser beam emitted from the blue laser diode 71 and elliptic boundaries of the elliptic cross sections P of the laser beams emitted from the adjacent blue laser diodes 71. Specifically, the predetermined gaps between the elliptic boundaries of the adjacent elliptic cross sections P in the shining spot S are T1 in relation to the row direction and T2 in relation to the column direction.

It is noted that the predetermined gaps between the elliptic boundaries of the adjacent elliptic cross sections P in the shining spot S can be adjusted by adjusting the collimator lenses 73 in such a way that the laser beams emitted from the blue laser diodes 71 are not made into completely parallel pencils of light but are made into slightly diffused pencils of light or in such away that in shining excitation light from the excitation light shining device 70 on to the luminescent light emitting area 103, a diffuse plate is disposed between the excitation light shining device 70 and the luminescent plate 101 so as to allow the laser beams from the blue laser diodes 71 to pass through the diffuse plate while being diffused in order to make the excitation light to be shone on to the luminescent light emitting area 103 uniform. This enables the predetermined gaps between the elliptic boundaries of the adjacent elliptic cross sections P in the shining spot S to be 0 or the adjacent elliptic boundaries to be brought into contact with each other.

In this way, the laser beams emitted from the adjacent blue laser diodes 71 are shone on to the luminescent light emitting area 103 so that the elliptic cross sections P of the laser beams so emitted do not overlap one another, and therefore, the laser beams emitted from the blue laser diodes 71 are shone on to the luminescent light emitting area 103 without interfering with one another, whereby light in the green wavelength range of a uniform luminous intensity can be emitted from the luminescent light emitting area 103.

Figure 8:
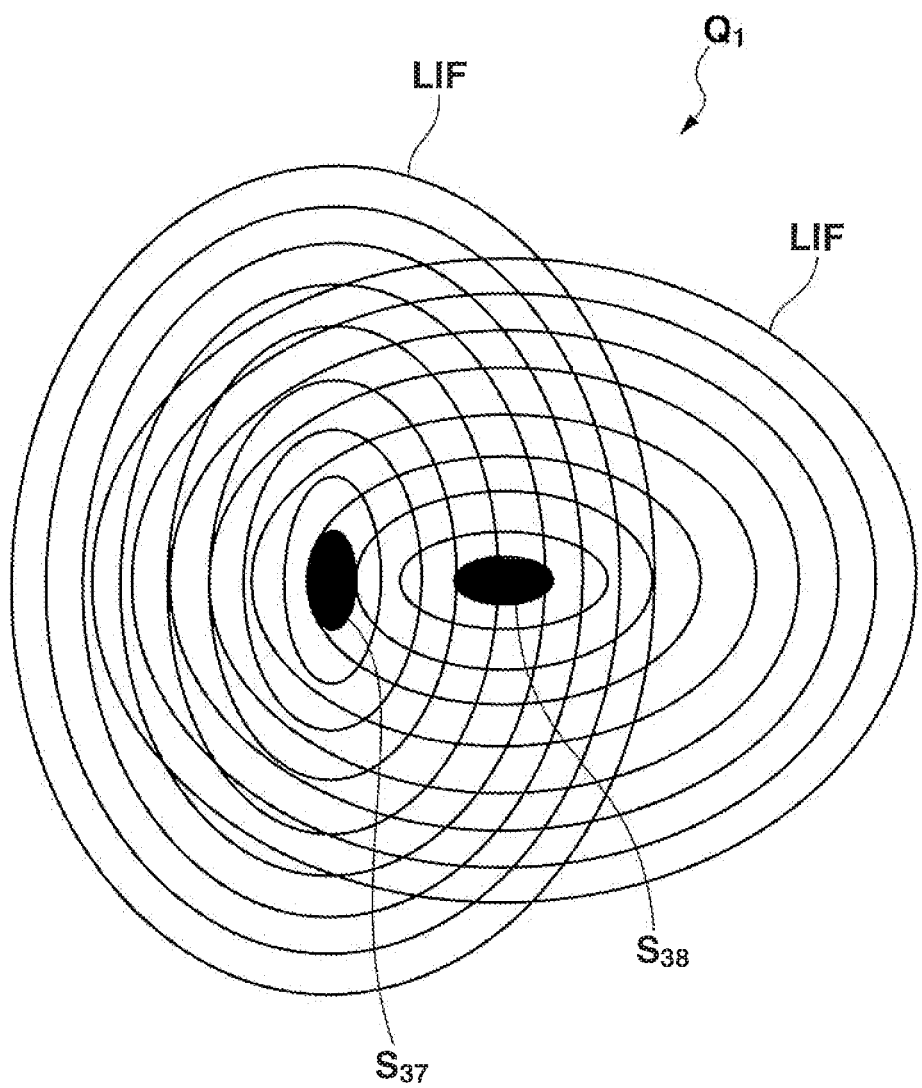
FIG. 8 is an enlarged partial view of a portion Q1 shown in FIG. 7B on the shining spot on the luminescent plate according to the first embodiment.

Although the laser beams emitted from the blue laser diodes 71 are pencils of light which are almost parallel, there occurs a case where the pencils of light are dispersed slightly or a case where interference fringes LIF are produced when the laser beams are shone through the diffuse plate. As this occurs, as shown in FIG. 8, interference fringes LIF of S37, S38 in the shining spot S which correspond to the elliptic cross sections P37, P38 of the laser beams emitted from the adjacent blue laser diodes 71 are such that lines of the respective interference fringes LIF overlap at fewer locations but intersect at more locations.

On the other hand, should the major axis directions of the elliptic cross sections P37, P38 of the laser beams emitted from the blue laser diodes 71 be oriented in the same direction, the lines of the interference fringes LIF overlap at more locations. Then, as an angle formed by the major axis directions of the elliptic cross sections P37, P38 of the laser beams emitted from the adjacent blue laser diodes 71 comes nearer to a right angle, the number of locations where the lines of the interference fringes LIF overlap is reduced, and hence, the interference fringes LIF come to intersect at more locations.

In the event that the lines of the interference fringes LIF overlap, the luminous intensities of the laser beams fluctuate. Then, in the event that the intensities of the laser beams fluctuate, the intensity of luminescent light in the green wavelength range which is excited by the laser beams is caused to fluctuate. In this embodiment, since the major axis directions of the elliptic cross sections S37, S38 of the laser beams which are emitted from the adjacent laser diodes 71 become normal to each other, the number of locations where the lines of the interference fringes LIF overlap can be reduced. In the event that the major axis directions of the elliptic cross sections S37, S38 of the laser beams emitted from the adjacent blue laser diodes 71 are parallel to each other, the lines of the interference fringes LIF come to overlap to be enhanced. However, in the event that the major axis directions of the elliptic cross sections S37, S38 of the laser beams emitted from the adjacent blue laser diodes 71 are normal to each other, even though the lines of the interference fringes LIF overlap, the lines are prevented from becoming conspicuous.

Second Embodiment

Figure 9A:
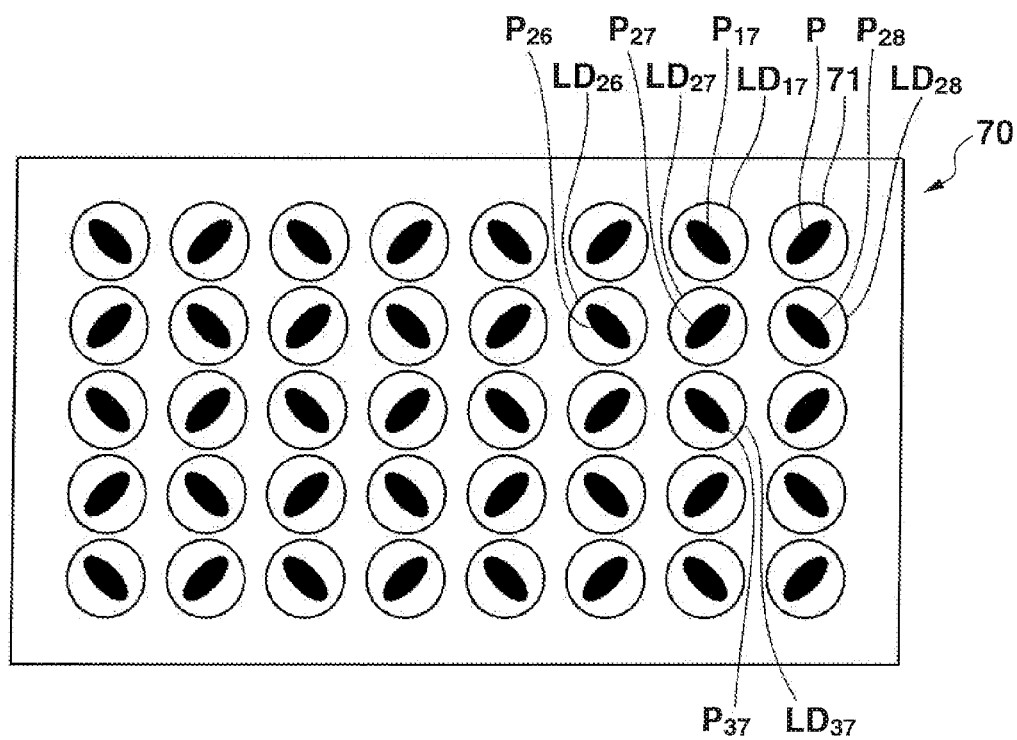
FIG. 9A is a front view of an excitation light shining device, showing a relationship between an arrangement of laser diodes according to a second embodiment of the invention and light beams shone by the laser diodes.
Figure 9B:
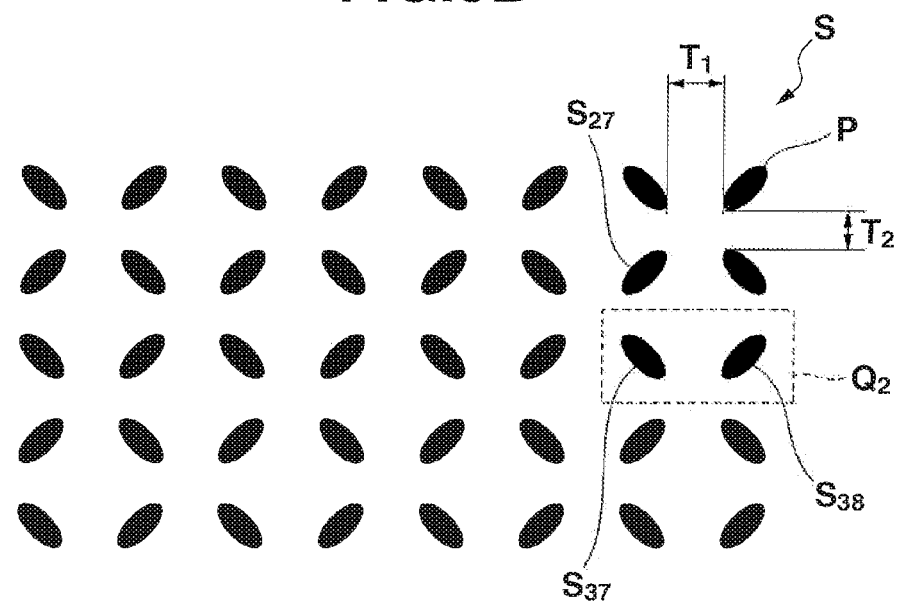
FIG. 9B is a diagram showing the relationship between the arrangement of the laser diodes according to the second embodiment of the invention and the light beams shone by the laser diodes, which shows how the light beams from the laser diodes are shone on to a shining spot on a luminescent plate.
Figure 10:
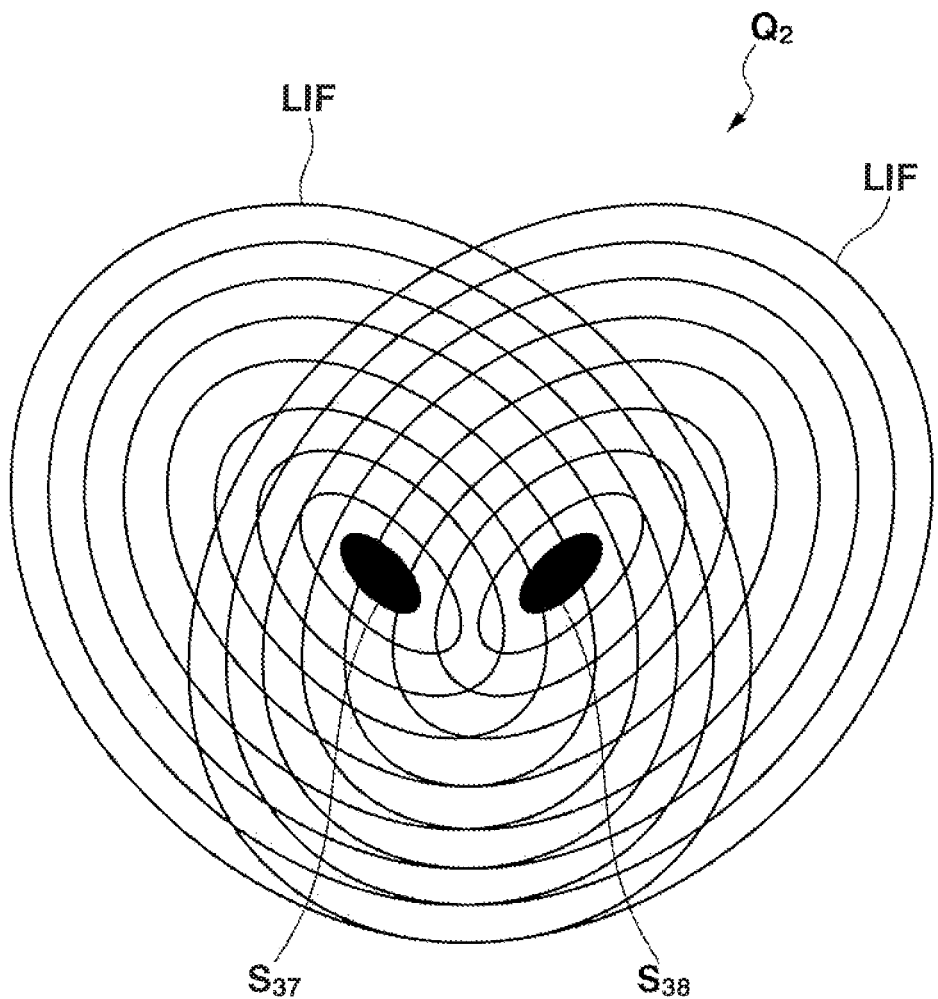
FIG. 10 is an enlarged partial view of a portion Q2 shown in FIG. 9B on the shining spot on the luminescent plate according to the second embodiment.

Next, FIGS. 9A, 9B and 10 show a second embodiment of the invention. In the following description, like reference numeral will be given to like members to those of the first embodiment, and the description thereof will be omitted. In this embodiment, in place of the arrangement of the laser diodes 71 in the first embodiment, as shown in FIG. 9A, blue laser diodes 71, which are semiconductor light emitting elements, are arranged so that major axis directions of elliptic cross sections P of laser beams emitted from the laser diodes 71 are inclined at an angle of 45 degrees with respect to a row direction and a column direction in which the blue laser diodes 71 are arranged in an excitation light shining device 70.

In this embodiment, too, the blue laser diodes 71 are disposed so that the major axis directions of the elliptic cross sections P of the laser beams emitted from the adjacent blue laser diodes 71 become normal to one another. Additionally, as shown in FIG. 9B, in a shining spot S, since the laser beams emitted from the blue laser diodes 71 are shone so as not to overlap one another, there is no such situation that the laser beams emitted from the blue laser diodes 71 interfere with one another. In this way, the laser beams which strike a luminescent light emitting area 103 are made difficult to overlap one another by disposing the adjacent blue laser diodes 71 at different angles, thereby making it possible to prevent the saturation in emission of a luminescent material.

Additionally, as shown in FIG. 10, as with the first embodiment, on a shining surface of the luminescent light emitting area 103 where the laser beams emitted from the blue laser diodes 71 are shone, an interference fringe LIF may be produced for each of the laser beams emitted from the blue laser diodes 71. In this embodiment, the number of locations where lines of interference fringes LIF overlap is slightly increased compared with the first embodiment. However, elliptic boundaries of the elliptic cross sections P of the laser beams emitted from each of the blue laser diodes 71 can be made closer to one another in the shining spot S than in the first embodiment, and therefore, the shining spot S can be formed smaller, whereby the width of the luminescent light emitting area 103 can be made thin.

Third Embodiment

Next, a third embodiment according to the invention will be described based on FIGS. 11, 12A and 12B. In the following description, like reference numeral will be given to like members to those of the first embodiment, and the description thereof will be omitted. In this embodiment, in place of the luminescent plate 101 in the first embodiment, as shown in FIGS. 12A, 12B, a luminescent plate 401 is used which is a luminescent wheel having a diffuse transmission area 105, and light emitted from an excitation light shining device 70 is also used as a blue light source. The diffuse transmission area 105 is formed by fitting a diffuse plate, in which fine irregularities are formed on a transparent base through sandblasting, in an arc-shaped hole portion in a base 102. Additionally, a luminescent light emitting area 103 and the diffuse transmission area 105 are provided continuously into an annular shape.

Figure 11:
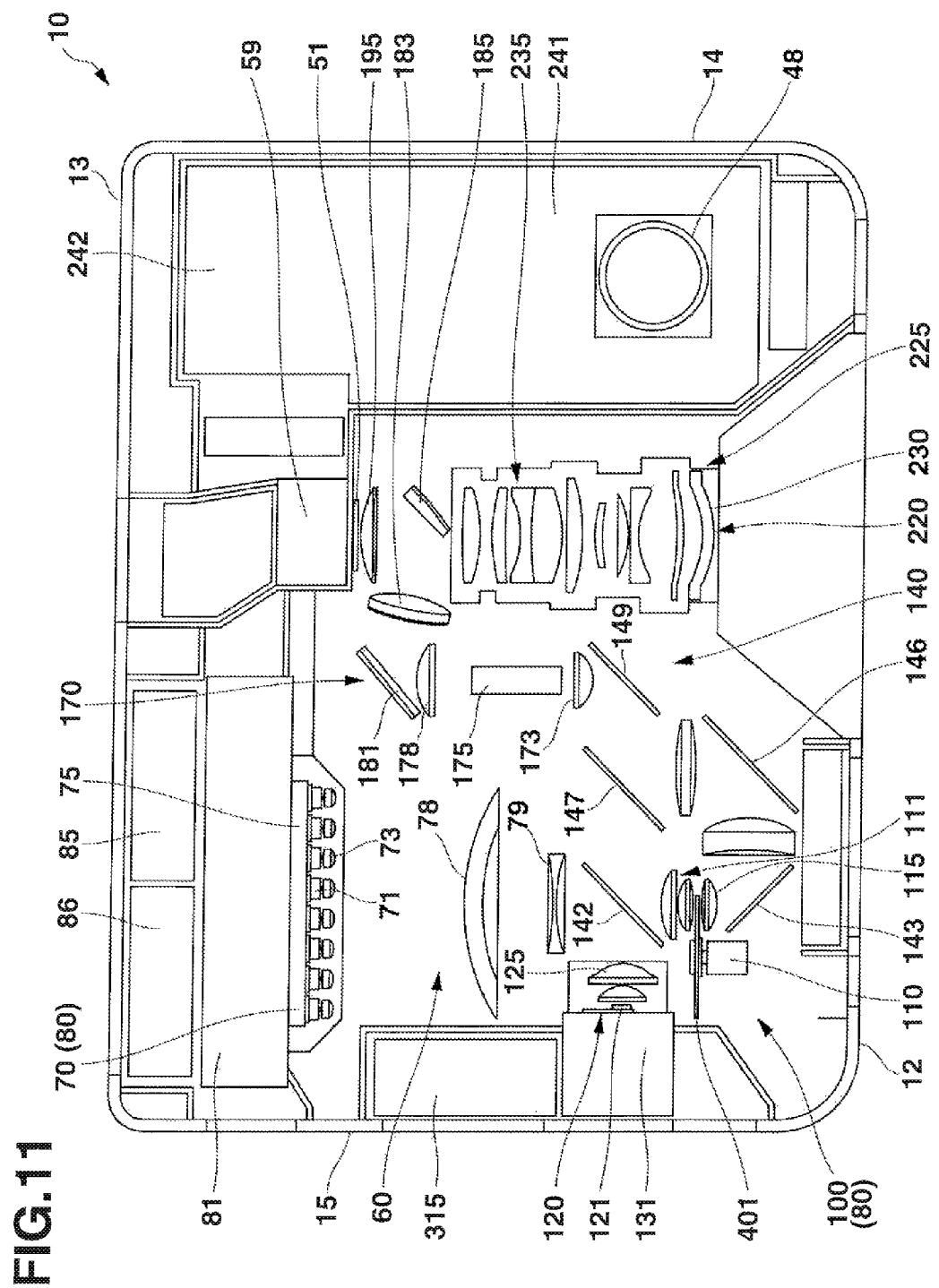
FIG. 11 is a schematic plan view showing an internal construction of a projector according to a third embodiment of the invention.
Figure 12A:
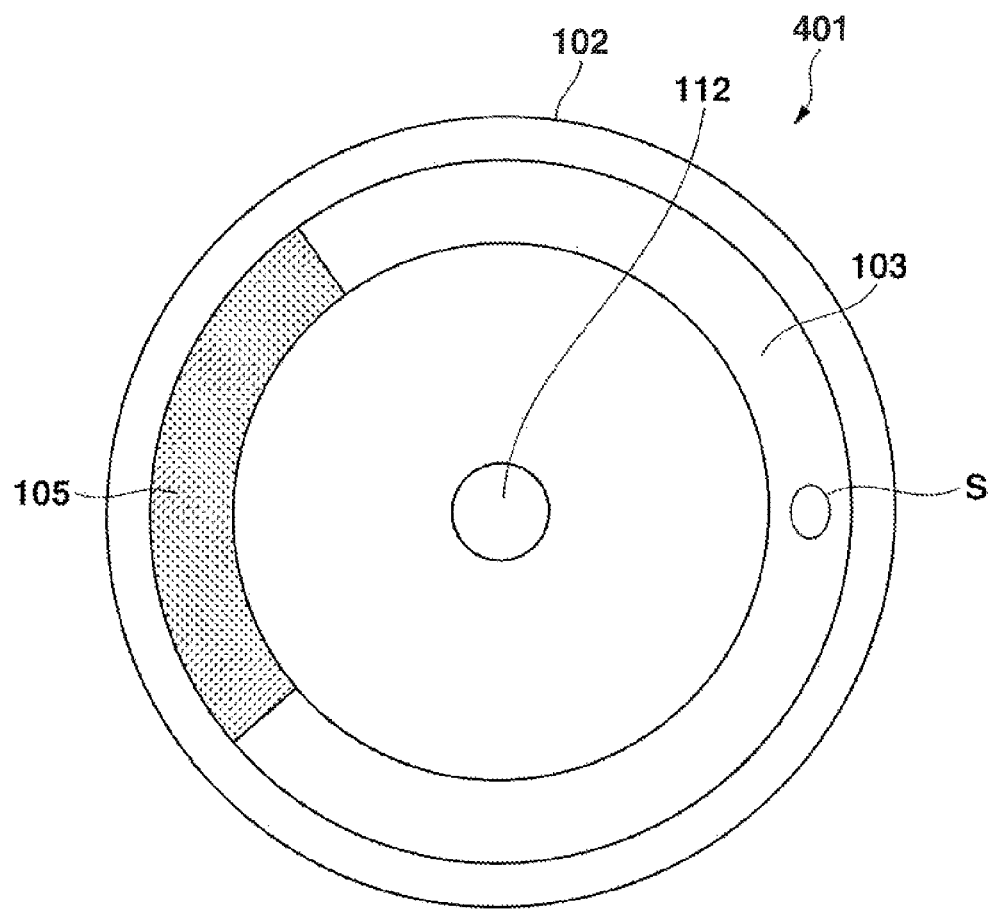
FIG. 12A is a front view of a luminescent plate according to the third embodiment of the invention.
Figure 12B:
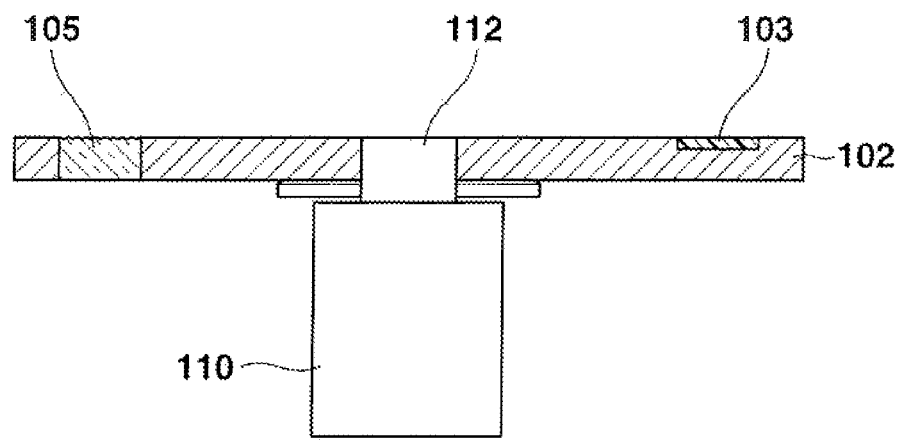
FIG. 12B is a sectional view of the luminescent plate according to the third embodiment of the invention.

As shown in FIG. 11, a collective lens 115 and a reflecting mirror 143 are disposed on a back side of a luminescent plate 401 of a luminescent plate device 100. The collective lens 115 collects light in the blue wavelength range which passes through the diffuse transmission area 105, and the reflecting mirror 143 reflects the light in the blue wavelength range so collected towards a left side panel 14. Then, the light in the blue wavelength range which is reflected by the reflecting mirror 143 is reflected towards a back panel 13 via a collective lens by a reflecting mirror 146. The light in the blue wavelength range which is reflected by the reflecting mirror 146 is reflected towards the left side panel 14 by a second dichroic mirror 147 and is then reflected towards the back panel 13 by a reflecting mirror 149.

A red light source device 120, which is a first light source, is disposed in a position where its optical axis intersects light in the green wavelength range which is emitted from the luminescent plate 401 at right angles and near a right side panel 15. Light in the red wavelength range is emitted from the red light source device 120 and passes through the first dichroic mirror 142 and the second dichroic mirror 147, then being reflected towards the back panel 13 by the reflecting mirror 149.

When light emitted from the excitation light shining device 70 is shone on to the luminescent light emitting area 103 of the luminescent plate 401 as excitation light, light in the green wavelength range is emitted from the luminescent plate 401. The light in the green wavelength range so emitted is reflected towards the left side panel 14 via a collective lens group 111 by the first dichroic mirror 142, passes through the second dichroic mirror 147 and is reflected towards the back panel 13 by the reflecting mirror 149.

Light in the red wavelength range, light in the green wavelength range and light in the blue wavelength range are reflected in the same direction towards the back panel 13 by the reflecting mirror 149 so as to enter a light tunnel 175 by way of a collective lens 173 to thereafter be guided to a display device 51 by a light source side optical system 170. In this way, also with the luminescent plate 401 having the diffuse transmission area 105, as with the first and second embodiments, the blue laser diodes 71 can be arranged so that a major axis direction of an elliptic cross section P of a laser beam emitted from one blue laser diode 71 become normal to major axis directions of elliptic cross sections P of laser beams emitted from adjacent laser diodes 71. Consequently, in a light source unit 60, no interference is produced by excitation light, which produces light in the green wavelength range whose intensity distribution is uniform, and the interference of light in the blue wave length range which is transmitted while being diffused can be reduced.

Thus, while the embodiments of the invention have been described heretofore, the invention is not limited by those embodiments and hence can be carried out in various modes. For example, while the blue laser diode 71 is used as the semiconductor light emitting element for the excitation light shining device 70, other types of semiconductor light emitting elements which emit other colors can also be used.

Thus, according to the embodiments of the invention, the plurality of blue laser diodes 71 which are semiconductor light emitting elements are arranged in rows and columns in the excitation light shining device 70. The blue laser diodes 71 are arranged so that the major axis direction of the elliptic cross section P of the laser beam which is emitted from one blue laser diode 71 becomes normal to the major axis directions of the elliptic cross sections P of the laser beams which are emitted from the adjacent blue laser diodes 71. In the excitation light shining device 70, the laser beams emitted from the blue laser diodes 71 do not overlap, and therefore, the interference of the laser beams with one another can be reduced.

The excitation light from the excitation light shining device 70 is shone on to the luminescent light emitting area 103 of the luminescent plate 101 in such a way that the predetermined gaps are maintained between the elliptic boundaries of the elliptic cross sections of the laser beams emitted from the blue laser diodes 71 or the elliptic boundaries are kept in contact with one another, whereby the shining spot S is formed. Since this reduces the overlapping of the interference fringes LIF between laser beams in the shining spot S, the green luminescent material is excited by the laser beams whose luminous intensity distribution is uniform. Consequently, since the luminescent light in the green wavelength range in which the luminous intensity is distributed uniformly is emitted, it is possible to obtain the light source light which is the clear image light in which the unevenness in luminance or color is reduced.

Additionally, the blue laser diodes 71 are arranged so that the major axis directions of the elliptic cross sections of the laser beams emitted from the blue laser diodes 71 become almost parallel to the row direction or the column direction in which the blue laser diodes 71 are aligned. This reduces most the overlapping of the interference fringes LIF which are produced on the shining surface of the shining spot S by the blue laser diodes 71 and facilitates the arrangement of the blue laser diodes 71 in the excitation light shining device 70.

The blue laser diodes 71 are arranged inclined so that the major axis directions of the elliptic cross sections of the laser beams emitted from the blue laser diodes 71 are at 45 degrees with respect to the row direction and the column direction in which the blue laser diodes 71 are aligned. This can not only reduce the overlapping of the interference fringes LIF which are produced in the shining surface of the shining spot S but also allow the shining spot S to be formed small. Consequently, since the luminescent light emitting area 103 of the luminescent plate 101 can be formed small, the light source unit 60 can be made small in size.

In the excitation light shining device 70, the semiconductor light emitting elements are formed as the blue laser diodes 71. This allows the laser diodes of the high luminous intensity to be used in order to emit excitation light which is shone on to the luminescent light emitting area 103 of the luminescent plate 101, and therefore, the bright light source light can be obtained.

The luminescent plate 401 has the diffuse transmission area 105 which transmits light emitted from the excitation light shining device 70 while diffusing the light. This enables the laser beams which are emitted from the blue laser diodes 71 of the excitation light shining device 70 to constitute the blue light sources.

The luminescent plate 104 has the luminescent light emitting area 103 and the diffuse transmission area 105 which are provided continuously into the annular shape and is driven to rotate by the motor 110. This can prevent the burning of the green luminescent material layer of the luminescent light emitting area 103 and reduce the temperature quenching by forming the luminescent plate 401 as the luminescent wheel.

The luminescent light in the green wavelength range is made to be emitted from the luminescent plate device 100, the red light source device 120 which emits light in the red wavelength range is configured as the first light source and the blue light source device 300 which emits light in the blue wavelength range is made to be the second light source. By adopting this configuration, the uniformly bright light source light can be obtained from the light source unit 60 having the light sources of the three primary colors.

The luminescent light in the green wavelength range is made to be emitted from the luminescent plate device 100, the light in the blue wavelength range which is transmitted while being diffused through the diffuse transmission area 105 of the luminescent plate device 100 is made to constitute the blue light source, and the red light source device 120 which emits light in the red wavelength range is made to be the first light source. Since this obviates the necessity of providing a blue light source device separately, the light source unit 60 having the light sources of the three primary colors can be formed small in size.

The projector 10 includes the light source unit 60 which includes the excitation light shining device 70, the display device 51, the projection side optical system 220 and the projector control unit. By adopting this configuration, the projector 10 can be provided which can project a clear color image on to the screen by reducing the unevenness in luminance or color of the projection light which is projected on to the screen through reduction of the interference of the laser beams of the blue laser diodes 71 of the excitation light shining device 70.

The embodiments which have been described heretofore are presented as the examples, and hence, the embodiments are not intended to limit the scope of the invention. The novel embodiments can be carried out in other various forms. Thus, various omissions, replacements and alterations can be made without departing from the spirit and scope of the invention. The embodiments and their modifications are included in the spirit and scope of the invention and the scope of inventions described in claims and their equivalents.

What is claimed is:

1. A light source unit comprising:
an excitation light shining device including a plurality of semiconductor light emitting elements which are arranged in rows and columns so that in the plurality of semiconductor light emitting elements, a direction of a major axis of an elliptic cross section of a light beam emitted from one semiconductor light emitting element is normal to the directions of major axes of elliptic cross sections of light beams emitted from adjacent semiconductor light emitting elements which are adjacent to the one semiconductor light emitting element along a row direction and along a column direction of the semiconductor light emitting elements.

2. The light source unit according to claim 1, further comprising:
a luminescent plate which emits luminescent light in a predetermined wavelength range as a result of excitation light which is light emitted from the excitation light shining device being shone onto a shining spot formed within a luminescent light emitting area having a luminescent material,
wherein the shining spot is formed so that predetermined gaps are kept defined between an elliptic boundary of the elliptic cross section of the light beam emitted from the one semiconductor light emitting element and elliptic boundaries of the elliptic cross sections of the light beams emitted from the adjacent semiconductor light emitting elements, or the elliptic boundary of the elliptic cross section of the light beam of the one semiconductor light emitting element is kept in contact with the elliptic boundaries of the elliptic cross sections of the light beams emitted from the adjacent semiconductor light emitting elements.

3. The light source unit according to claim 1, wherein the major axis directions of the elliptic cross sections of the light beams emitted from the semiconductor light emitting elements are almost parallel to the row direction or are almost parallel to the column direction in which the semiconductor light emitting elements are aligned.

4. The light source unit according to claim 2, wherein the major axis directions of the elliptic cross sections of the light beams emitted from the semiconductor light emitting elements are almost parallel to the row direction or are almost parallel to the column direction in which the semiconductor light emitting elements are aligned.

5. The light source unit according to claim 1, wherein the major axis directions of the elliptic cross sections of the light beams emitted from the semiconductor light emitting elements are inclined at an angle of almost 45 degrees with respect to the row direction and the column direction in which the semiconductor light emitting elements are aligned.

6. The light source unit according to claim 2, wherein the major axis directions of the elliptic cross sections of the light beams emitted from the semiconductor light emitting elements are inclined at an angle of almost 45 degrees with respect to the row direction and the column direction in which the semiconductor light emitting elements are aligned.

7. The light source unit according to claim 1, wherein the semiconductor light emitting elements are laser diodes.

8. The light source unit according to claim 2, further comprising:
a first light source which emits light in a wavelength range which differs from those of the luminescent light and the excitation light; and
a second light source which emits light in a wavelength range which differs from those of the luminescent light and the light emitted from the first light source.

9. The light source unit according to claim 2, wherein the luminescent plate has a diffuse transmission area which transmits light beams emitted from the semiconductor light emitting elements while diffusing them.

10. The light source unit according to claim 9, wherein the luminescent plate has the luminescent light emitting area and the diffuse transmission area which are provided thereon continuously into an annular shape and the luminescent plate is driven to rotate by a motor.

11. The light source unit according to claim 10, further comprising:
a first light source which emits light in a wavelength range which differs from those of the luminescent light and the excitation light.

12. A projector comprising:
the light source unit according to claim 8;
a display device onto which light source light from the light source unit is shone to thereby form image light;
a projection side optical system which projects the image light emitted from the display device onto a screen; and
a projector control unit which controls the display device and the light source unit.

13. A projector comprising:
the light source unit according to claim 11;
a display device onto which light source light from the light source unit is shone to thereby form image light;
a projection side optical system which projects the image light emitted from the display device onto a screen; and
a projector control unit which controls the display device and the light source unit.

14. A light source unit comprising:
an excitation light shining device including a plurality of semiconductor light emitting elements which arranged in rows and columns so that in the plurality of semiconductor light emitting elements, the direction of a major axis of an elliptic cross section of a light beam emitted from one semiconductor light emitting element is normal to the directions of major axes of elliptic cross sections of light beams emitted from adjacent light emitting elements,
wherein a shining spot formed at a time of a light emitted from the excitation light shining device being shone onto a shining surface is formed so that predetermined gaps are kept defined between an elliptic boundary of the elliptic cross section of the light beam emitted from the one semiconductor light emitting element and elliptic boundaries of the elliptic cross sections of the light beams emitted from the adjacent semiconductor light emitting elements, or the elliptic boundary of the elliptic cross section of the light beam of the one semiconductor light emitting element is kept in contact with the elliptic boundaries of the elliptic cross sections of the light beams emitted from the adjacent semiconductor light emitting elements.

* * * * *